United States Patent
Kato et al.

(10) Patent No.: US 8,012,628 B2
(45) Date of Patent: Sep. 6, 2011

(54) POLYMER ELECTROCHEMICAL DEVICE

(75) Inventors: Toshinori Kato, Tsukuba (JP); Tomohiro Ono, Tsukuba (JP); Shinji Nakai, Tsukuba (JP); Takeshi Nakano, Tsukuba (JP); Hiroyuki Ogi, Tsukuba (JP)

(73) Assignee: Kuraray Co., Ltd., Kurashiki-shi (JP)

( * ) Notice: Subject to any disclaimer, the term of this patent is extended or adjusted under 35 U.S.C. 154(b) by 1048 days.

(21) Appl. No.: 11/762,470

(22) Filed: Jun. 13, 2007

(65) Prior Publication Data

US 2008/0014505 A1    Jan. 17, 2008

(30) Foreign Application Priority Data

Jun. 19, 2006  (JP) ................................. 2006-169461

(51) Int. Cl.
*H01M 2/16*    (2006.01)
(52) U.S. Cl. .................. 429/246; 429/477; 429/247
(58) Field of Classification Search .................. 429/477, 429/246, 247
See application file for complete search history.

(56) References Cited

U.S. PATENT DOCUMENTS

| | | | |
|---|---|---|---|
| 5,196,484 | A | 3/1993 | Giles et al. |
| 5,677,074 | A | 10/1997 | Serpico et al. |
| 2006/0014902 | A1 | 1/2006 | Mays et al. |

FOREIGN PATENT DOCUMENTS

| | | |
|---|---|---|
| EP | 1840993 | 10/2007 |
| JP | 63-309252 | 12/1988 |
| JP | 4-275078 | 9/1992 |
| WO | 00/50771 | 8/2000 |
| WO | 02/09850 | 2/2002 |
| WO | 2004/045014 | 5/2004 |
| WO | 2007/010039 | 1/2007 |

OTHER PUBLICATIONS

U.S. Appl. No. 12/523,814, filed Jul. 20. 2009, Ohgi, et al.
U.S. Appl. No. 12/162,375, filed Jul. 28, 2008, Ono, et al.
U.S. Appl. No. 12/278,794, filed Aug. 8, 2008, Ono, et al.

*Primary Examiner* — Jane Rhee
(74) *Attorney, Agent, or Firm* — Oblon, Spivak, McClelland, Maier & Neustadt, L.L.P.

(57) ABSTRACT

This invention relates to an electrochemical device which comprises a molding containing as a main ingredient a copolymer (Z) and at least two mutually insulated electrodes in joint with the molding, wherein the copolymer (Z) comprises a polymer block (A) having as a main unit an aromatic vinyl compound unit and a polymer block (B) being incompatible with the polymer block (A), and has ion-conducting groups on the polymer block (A). The electrochemical device of the invention can be used particularly as an actuator device.

8 Claims, 1 Drawing Sheet

In water
(before application of voltage)

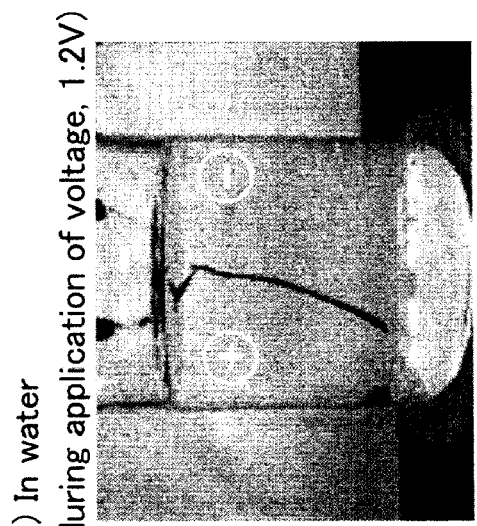
(i) In water
(before application of voltage)
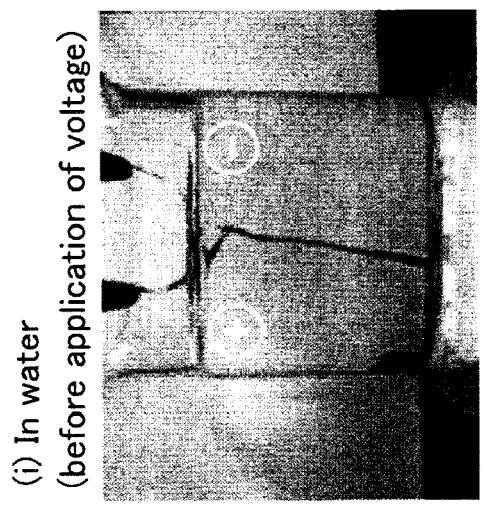
(ii) In water
(during application of voltage, 1.2V)
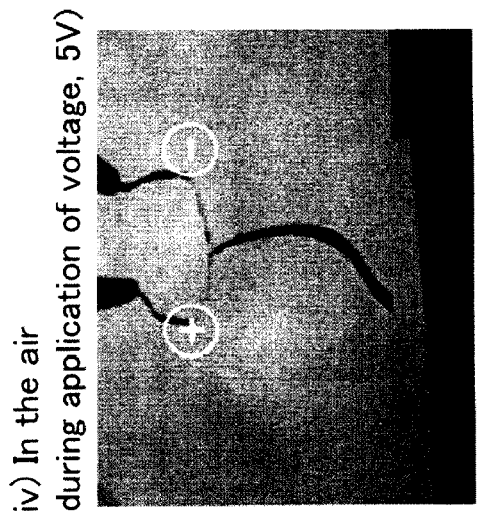
(iv) In the air
(before application of voltage)
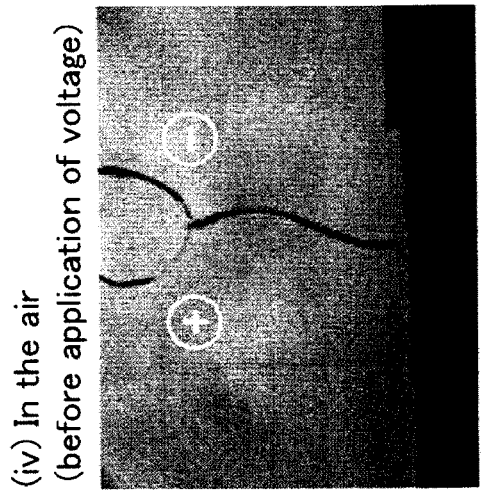
(iv) In the air
(during application of voltage, 5V)

POLYMER ELECTROCHEMICAL DEVICE

TECHNICAL FIELD

This invention relates to an electrochemical device, especially an actuator device, containing as its constituent a specific polymer, and more specifically, relates to an electrochemical device, especially an actuator device, containing as its constituent a specific copolymer having ion-conducting groups.

BACKGROUND ART

In the fields of medical instruments, micromachinery, etc., need for miniature and lightweight actuators increases. Further, also in the fields of industrial robots, personal robots, etc., need for lightweight and flexible actuators increases.

It is said that since when an actuator is miniaturized, friction and viscosity become dominant than inertial force, a mechanism to convert energy into motion utilizing inertial force, as in motors and engines, is hard to use as an actuator for microminiature machines. As kinds of microminiature actuators in view of actuation mechanisms so far proposed, an electrostatic attractive force-type one, a piezoelectric one, an ultrasonic one, a shape memory alloy-type one, etc. are known. An electrostatic attractive force-type actuator is one wherein a plate or rod as one of the electrodes is attracted to the counter electrode, and one wherein one of the electrodes is bent by applying a voltage of the order of 100 V between the electrode and the other counter electrode scores of μm apart from the former electrode is known. A piezoelectric actuator is one wherein a voltage of hundreds to thousands is applied to the piezoelectric element made of a ceramic such as barium titanate or lead zirconate titanate to make the device expand and contract, and one capable of controlling a displacement of the order of nm is known. As an ultrasonic actuator, one to operate by causing dislocation with a combination of ultrasonic oscillation generated by a piezoelectric element or the like and frictional force is known. A shape memory alloy-type actuator largely changes in shape in accordance with temperature, and operates by changing temperature. However, these types of actuators have problems that since they are made of inorganic substance(s) such as metal(s) or ceramic(s), there is a limitation in softening and/or lightening thereof; and since they are complicated in structure, their miniaturization is not always easy; and so on.

As an actuator capable of overcoming the above problems, polymer actuators draw attention recently. For example, polymer actuators utilizing change in the shape of the hydrated polymer gel due to stimulation such as temperature change, pH change or application of electric field are devised (e.g., refer to JP-A-63-309252). However, since the change in shape of hydrated polymer gels due to various stimulations is generally very slow, and, further, the mechanical strength of hydrated polymer gels is low due to their not uniform crosslinkage structure, further improvement is necessary for actually utilizing such a polymer actuator as an actuator.

In order to overcome the above problems, a polymer actuator is devised which is composed of an ion exchange resin membrane and electrodes jointed to both surfaces thereof, and wherein an electric field is applied to the ion exchange resin membrane to bend and deform the membrane (e.g., refer to JP-B-1966645).

However, in the above-mentioned polymer actuators, an ion exchange resin containing fluorine atoms such as a sulfonic acid groups-containing fluororesin membrane (e.g., Nafion made by DuPont Co.) is often used, but there are problems that it has a large bad influence on the environment and the costs of the ion exchange resin or the membrane made of the resin are high. In the above JP-B-1966645, as an example not containing fluorine atoms, a polymer actuator using a polystyrenesulfonic acid membrane is exemplified, but there are problems that its size is very small, its shape is limited because the polystyrenesulfonic acid membrane is in a crosslinked state, and, further, its dynamic strength is poor due to its not uniform crosslinkage structure.

DISCLOSURE OF INVENTION

The invention aims to provide a polymer electrochemical device, more specifically an electrochemical device composed of a molding containing a particular copolymer and electrodes, and, further, a polymer actuator device composed of the electrochemical device.

The present inventors have intensely studied, and as a result they found that a polymer electrochemical device or thus polymer actuator device composed of a molding containing a copolymer fulfilling particular requisites and at least two electrodes jointed to the molding and mutually insulated is excellent in industrial economical efficiency; does not contain halogen which may have an influence on the environment; is excellent in dynamic properties; and shows swift actuation.

Namely, this invention relates to an electrochemical device which comprises a molding containing as a main ingredient a copolymer (Z) and at least two mutually insulated electrodes in joint with the molding, wherein the copolymer (Z) comprises a polymer block (A) having as a main unit (=a main repeating unit) an aromatic vinyl compound unit and a polymer block (B) being incompatible with the polymer block (A), and has ion-conducting groups on the polymer block (A).

The electrochemical device or thus actuator device of the invention has advantages that it can be actuated swiftly because ion channels are formed and ions can move smoothly; it is excellent in industrial economical efficiency because of using an inexpensive copolymer; and influence on the environment is small because of substantially not containing halogen such as fluorine. Further, the electrochemical device or actuator device of the invention holds self-standing properties without introduction of nonuniform chemical crosslinkage structure, by using the copolymer, and, further, is excellent in mechanical strength. The electrochemical device or actuator device of the invention having advantages as mentioned above can suitably be used in uses such as micromachines, industrial and personal robots, etc.

When, as a main unit (=main repeating unit) composing polymer block (B) as one of the constituents of copolymer (Z) as a main ingredient of the molding as one of the requisite components of the electrochemical device of the invention, at least one selected from the group consisting of alkene units having 2 to 8 carbon atoms; cycloalkene units having 5 to 8 carbon atoms; vinycycloalkene units having 7 to 10 carbon atoms; conjugated alkadiene units having 4 to 8 carbon atoms; conjugated cycloalkadiene units having 5 to 8 carbon atoms; and vinycycloalkene units having 7 to 10 carbon atoms, conjugated alkadiene units having 4 to 8 carbon atoms, and conjugated cycloalkadiene units having 5 to 8 carbon atoms wherein part or all of the carbon-carbon double bonds are hydrogenated; particularly, a conjugated alkadiene unit having 4 to 8 carbon atoms or a conjugated alkadiene unit having 4 to 8 carbon atoms wherein part or all of the carbon-carbon double bonds are hydrogenated is selected, the electrochemical device of the invention is excellent in flexibility and elongation, in addition to the above-mentioned effects, and it becomes possible to apply the actuator device to more various uses, for example a use wherein flexibility is required such as artificial muscle.

BRIEF DESCRIPTION OF THE DRAWING

FIG. 1 is a drawing showing the result of an actuation test on the sulfonated mSEBmS-gold electrodes composite produced in Example 1 (electrochemical device of the invention).

BEST MODE FOR CARRYING OUT THE INVENTION

The electrochemical device of the invention comprises a molding containing as a main ingredient a copolymer (Z) and at least two mutually insulated electrodes in joint with the molding, wherein the copolymer (Z) comprises a polymer block (A) having as a main unit an aromatic vinyl compound unit and a polymer block (B) being incompatible with the polymer block (A), and has ion-conducting groups on the polymer block (A).

The aromatic vinyl compound unit in polymer block (A) of copolymer (Z) used in the invention is preferably at least one selected from units represented by the general formula (I)

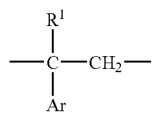

(I)

wherein $R^1$ represents a hydrogen atom, an alkyl group having 1 to 8 carbon atoms or an aryl group having 6 to 14 carbon atoms which may have 1 to 3 substituents, and Ar represents an aryl group having 6 to 14 carbon atoms which may have 1 to 3 substituents;
and is more preferably at least one selected from units represented by the general formula (II) which is included in the above general formula (I)

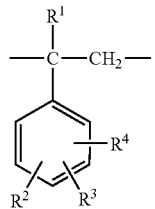

(II)

wherein $R^2$ to $R^4$ represent respectively independently hydrogen atoms, alkyl groups having 1 to 4 carbon atoms or alkoxyl groups having 1 to 4 carbon atoms, and $R^1$ represents a hydrogen atom, an alkyl group having 1 to 8 carbon atoms or an aryl group having 6 to 14 carbon atoms which may have 1 to 3 substituents.

It is preferred that $R^1$ in the general formula (I) or (II) is an alkyl group having 1 to 8 carbon atoms or an aryl group having 6 to 14 carbon atoms which may have 1 to 3 substituents, because, in the case, the radical resistance (oxidation resistance) of copolymer (Z) is excellent.

In the definition of Ar of the general formula (I), as the aryl group having 6 to 14 carbon atoms, there can be mentioned a phenyl group, a naphthyl group, an anthryl group, an phenanthryl group, an indenyl group, a biphenylyl group, etc., and as the 1 to 3 substituents which may bond to the aryl group, there can be mentioned, respectively independently, straight-chain or branched alkyl groups having 1 to 4 carbon atoms (methyl groups, ethyl groups, propyl groups, isopropyl groups, butyl groups, isobutyl groups, tert-butyl groups, etc.), straight-chain or branched alkoxyl groups having 1 to 4 carbon atoms (methoxyl groups, ethoxyl groups, propoxyl groups, butoxyl groups, isobutyloxy groups, etc.).

In the definition of $R^1$ of the general formulae (I) and (II), the alkyl group having 1 to 8 carbon atoms may be straight-chain or branched and includes a methyl group, an ethyl group, a propyl group, an isopropyl group, a butyl group, an isobutyl group, a tert-butyl group, a pentyl group, a neopentyl group, a tert-pentyl group, a hexyl group, a heptyl group, an octyl group, a 2-ethylhexyl group, etc.

In the definition of $R^2$ to $R^4$ of the general formula (II), the alkyl groups having 1 to 4 carbon atoms may be straight-chain or branched and include methyl groups, ethyl groups, propyl groups, butyl groups, isobutyl groups, etc.; and the alkoxyl groups having 1 to 4 carbon atoms may be straight-chain or branched and include methoxyl groups, ethoxyl groups, propoxyl groups, butoxyl groups, isobutyloxy groups, etc.

As the aromatic vinyl compound giving the aromatic vinyl compound unit as the main unit of polymer block (A) in copolymer (Z) used in the invention, there can, for example, be mentioned aromatic vinyl compounds optionally having substituent(s) on the aromatic ring such as styrene, 2-methylstyrene, 3-methylstyrene, 4-methylstyrene, 2-methoxystyrene, 3-methoxystyrene, 4-methoxystyrene, vinylnaphthalene, vinylanthracene, vinylphenanthrene and vinylpyrene; α-substituted aromatic vinyl compounds such as α-methylstyrene, α-ethylstyrene, α-propylstyrene, α-butylstyrene, α-pentylstyrene, α-hexylstyrene, α-heptylstyrene, α-octylstyrene, α-isopropylstyrene, α-tert-butylstyrene, α-isobutylstyrene, α-tert-pentylstyrene, α-neopentylstyrene, 1,1-diphenylstyrene, 1-methyl-1-naphthylethylene and 1-methyl-1-biphenylylethylene; styrene compounds having substituents at the α-position and on the aromatic ring such as 4, α-dimethylstyrene; etc. Among the above aromatic vinyl compounds, styrene and α-methylstyrene are preferred in view of industrial economical efficiency, easiness of polymerization and easiness of introduction of an ion-conducting group described later, and α-methylstyrene is further preferred because a copolymer (Z) having, as a main unit of polymer block (A), an aromatic vinyl compound unit whose α-carbon is quaternary carbon is excellent in radical resistance (oxidation resistance). These aromatic vinyl compounds can be used alone or in a combination of two or more. When two or more are copolymerized, the form of the copolymerization can be random copolymerization, block copolymerization, graft copolymerization or tapered copolymerization.

Polymer block (A) can contain one or plural other monomer units, besides the aromatic vinyl compound unit represented by the general formula (I), so long as they do not spoil the effects of the invention. As monomers giving such other monomer units, there can, for example, be mentioned conjugated alkadienes having 4 to 8 carbon atoms (specific examples are the same as in the description of polymer block (B) mentioned later); alkenes having 2 to 8 carbon atoms (specific examples are the same as in the description of polymer block (B) mentioned later); (meth)acrylic esters (methyl (meth)acrylate, ethyl(meth)acrylate, butyl(meth)acrylate, octyl(meth)acrylate, benzyl(meth)acrylate, etc.); vinyl esters (vinyl acetate, vinyl propionate, vinyl butyrate, vinyl pivalate, etc.); vinyl ethers (methyl vinyl ether, ethyl vinyl ether, isobutyl vinyl ether, etc.); etc. The form of the copolymerization of the aromatic vinyl compound giving the unit of the general formula (I) with the above other monomer(s) needs to be random copolymerization.

The proportion of the aromatic vinyl compound unit contained in polymer block (A) is preferably 50% by mol or more, more preferably 70% by mol or more, still more preferably 90% by mol or more, in view of introducing a sufficient amount of ion-conducting groups into polymer block (A).

The molecular weight of polymer block (A) in a state that an ion-conducting group is not introduced is appropriately chosen depending on the shape, required performance, etc. of the resulting electrochemical device. Usually, the molecular weight is preferably chosen between 100 and 1,000,000, and more preferably chosen between 1,000 and 100,000, as number average molecular weight in terms of polystyrene.

Copolymer (Z) used in the invention has, besides polymer block (A), a polymer block (B) which is incompatible with polymer block (A).

Because polymer block (A) and polymer block (B) are incompatible, copolymer (Z) forms micro-phase separation structure, and phase(s) formed by polymer block (A) function(s) as an ion channel and serve(s) as movement path(s) for an ion, and phase(s) formed by polymer block (B) has/have a role of holding the shape of the whole electrochemical device. Further, when polymer block (B) is a flexible component, it becomes possible to give resiliency and flexibility to the whole electrochemical device. Substantially, polymer block (B) does not have any ion-conducting group.

As a main unit of polymer block (B), there can be mentioned an alkene unit having 2 to 8 carbon atoms; a cycloalkene unit having 5 to 8 carbon atoms; a conjugated alkadiene unit having 4 to 8 carbon atoms; a vinycycloalkene unit having 7 to 10 carbon atoms; a conjugated cycloalkadiene unit having 5 to 8 carbon atoms; a conjugated alkadiene unit having 4 to 8 carbon atoms wherein part or all of the carbon-carbon double bonds are hydrogenated; a vinycycloalkene unit having 7 to 10 carbon atoms wherein part or all of the carbon-carbon double bonds are hydrogenated; a conjugated cycloalkadiene unit having 5 to 8 carbon atoms wherein part or all of the carbon-carbon double bonds are hydrogenated; a (meth)acrylic ester unit; a vinyl ester unit; a vinyl ether unit; etc. Vinyl compounds giving these units can be used alone or in a combination of two or more. When two or more are copolymerized, the form thereof can be random copolymerization, block copolymerization, graft copolymerization or tapered copolymerization. When a monomer used in the (co) polymerization has two carbon-carbon double bonds, any of them can be used in the polymerization, and in the case of a conjugated alkadiene either of 1,2-bond and 1,4-bond can be used in the polymerization, and so long as the glass transition point or softening point is 50° C. or less, there is no particular limitation on the proportion between 1,2-bond and 1,4-bond.

When the main unit of polymer block (B) is at least one selected from an alkene unit having 2 to 8 carbon atoms; a cycloalkene unit having 5 to 8 carbon atoms; a conjugated alkadiene unit having 4 to 8 carbon atoms; a vinylcycloalkene unit having 7 to 10 carbon atoms; a conjugated cycloalkadiene unit having 5 to 8 carbon atoms; a conjugated alkadiene unit having 4 to 8 carbon atoms wherein part or all of the carbon-carbon double bonds are hydrogenated; a vinycycloalkenes unit having 7 to 10 carbon atoms wherein part or all of the carbon-carbon double bonds are hydrogenated; and a conjugated cycloalkadiene unit having 5 to 8 carbon atoms wherein part or all of the carbon-carbon double bonds are hydrogenated, the resulting copolymer (Z) and thus electrochemical device of the invention are excellent in flexibility and elongation. In view of further enhancement of flexibility and elongation, industrial economical efficiency and easiness of polymerization, it is further preferred that the main unit of polymer block (B) is a conjugated alkadiene unit having 4 to 8 carbon atoms or a conjugated alkadiene unit having 4 to 8 carbon atoms wherein part or all of the carbon-carbon double bonds are hydrogenated. However, since according to the bond form of each unit, the polymer block becomes crystalline, as stated later in the description of polymer block (C), when flexibility and elongation come into question, polymer block (B) is assumed not to be crystalline.

When the main unit constituting polymer block (B) has a carbon-carbon double bond as in a vinylcycloalkene unit, a conjugated alkadiene unit or a conjugated cycloalkadiene unit, it is preferred that 30% by mol or more of the carbon-carbon double bonds is hydrogenated, it is further preferred that 50% by mol or more of the carbon-carbon double bonds is hydrogenated, it is still further preferred that 70% by mol or more of the carbon-carbon double bonds is hydrogenated, and it is yet still further preferred that 90% by mol or more of the carbon-carbon double bonds is hydrogenated, in view of enhancement of the deterioration resistance, etc. of the electrochemical device of the invention. The proportion of hydrogenation of the carbon-carbon double bonds can be calculated according to a method generally used, for example, a method of measuring iodine number, $^1$H-NMR measurement, or the like.

Monomers giving main units of polymer block (B) as mentioned above are described. Alkenes having 2 to 8 carbon atoms include ethylene, propylene, 1-butene, 2-butene, isobutene, 1-pentene, 2-pentene, 1-hexene, 2-hexene, 4-methyl-1-pentene, 1-heptene, 2-heptene, 1-octene, 2-octene, etc.; cycloalkenes having 5 to 8 carbon atoms include cyclopentene, cyclohexene, cycloheptene and cyclooctene; vinylcycloalkenes having 7 to 10 carbon atoms include vinylcyclopentene, vinylcyclohexene, vinylcycloheptene, vinylcyclooctene, etc.; conjugated alkadienes having 4 to 8 carbon atoms include 1,3-butadiene, 1,3-pentadiene, isoprene, 1,3-hexadiene, 2,4-hexadiene, 2,3-dimethyl-1,3-butadiene, 2-ethyl-1,3-butadiene, 1,3-heptadiene, 2,4-heptadiene, 3,5-heptadiene, etc.; and conjugated cycloalkadienes having 5 to 8 carbon atoms include cyclopentadiene, 1,3-cyclohexadiene, etc. (Meth)acrylic esters, vinyl esters and vinyl ethers include similar ones as in the description of polymer block (A).

Polymer block (B) can contain, besides the monomer unit as mentioned above, another monomer unit, for example an aromatic vinyl compound unit such as a styrene unit or a vinylnaphthalene unit, or the like, in such a range that the function of polymer block (B) to be incompatible with polymer block (A) is not spoiled. In this case, the form of the copolymerization of the monomer giving the main unit with another monomer needs to be random copolymerization. The use amount of the monomer giving the main unit of polymer block (B) is preferably 70% by mass or more, more preferably 90% by mass or more, based on the total of the monomer giving the main unit and another monomer.

The molecular weight of polymer block (B) is appropriately chosen depending on the shape, required performance, etc. of the resulting electrochemical device. Usually, the molecular weight is preferably chosen between 100 and 1,000,000, and more preferably chosen between 1,000 and 100,000, as number average molecular weight in terms of polystyrene.

The structure of copolymer (Z) comprising polymer block (A) and polymer block (B) as constituents is not particularly limited, and there can be mentioned, as its examples, an A-B diblock copolymer, an A-B-A triblock copolymer, a B-A-B triblock copolymer, an A-B-A-B tetrablock copolymer, an A-B-A-B-A pentablock copolymer, a B-A-B-A-B pentablock copolymer, an (A-B)$_n$X star copolymer (X represents the residue of a coupling agent), etc. These can be used alone or in a combination of two or more.

The form of bond between polymer block (A) and polymer block (B) is not limited to a block bond as mentioned above, and can also be a form wherein one is graft bonded to the other. In this case, either of polymer blocks (A) and (B) can be a stem or a branch, but, in view of easiness of preparation, it is preferred that polymer block (B) is a stem and polymer block (A) is a branch.

The mass ratio of polymer block (A) to polymer block (B) is preferably 90:10 to 10:90 and more preferably 80:20 to 20:80. When the mass proportion of polymer block (A) is more than 90% by mass, the proportion of polymer block (B) having a function to hold the shape of the resulting electrochemical device is relatively lowered and shape keeping properties of copolymer (Z) is undesirably lowered. When the mass proportion of polymer block (A) is less than 10% by mass, polymer block (A) functioning as an ion-conducting phase becomes hard to form a continuous phase, and, as a result, ion conductivity is lowered and the function of the resulting electrochemical device is lowered.

The copolymer (Z) used in the invention can contain another polymer block (C) different from polymer block (A) and polymer block (B).

Polymer block (C) is not limited so long as it is a component going into micro phase separation from polymer block (A) and polymer block (B). Substantially, polymer block (C) does not have any ion-conducting group. As a monomer unit capable of constituting polymer block (C), there can, for example, be mentioned an aromatic vinyl compound unit represented by the aforementioned general formula (I) or (II); a unit of a conjugated alkadiene having 4 to 8 carbon atoms (specific examples are the same as those mentioned in the description of polymer block (B)); a unit of an alkene having 2 to 8 carbon atoms (specific examples are the same as those mentioned in the description of polymer block (B)); a unit of a (meth)acrylic ester (specific examples are the same as those mentioned in the description of polymer block (A)); a unit of a vinyl ester (specific examples are the same as those mentioned in the description of polymer block (A)); a unit of a vinyl ether (specific examples are the same as those mentioned in the description of polymer block (A)); etc. The number of the monomer unit constituting polymer block (C) can be one or plural.

When polymer block (C) is made to have a function of going into micro phase separation from polymer block (A) and polymer block (B) and acting as a cramping phase (a phase functioning so as to hold the phase separation structure of copolymer (Z)), the molding constituting the electrochemical device of the invention, having such polymer block (C) tends to be excellent in shape and form stability, durability, and mechanical characteristics under a wet environment. In this case, as a preferred example of the monomer unit constituting polymer block (C), there can be mentioned the above-mentioned aromatic vinyl compound units. It is also possible to give the above functions by making polymer block (C) crystalline.

When the aromatic vinyl compound unit is relied on for the above functions, the proportion of the aromatic vinyl compound unit in polymer block (C) is preferably 50% by mass or more, more preferably 70% by mass or more and still more preferably 90% by mass or more of polymer block (C). Further, from the same viewpoint as above, it is desirable that units other than the aromatic vinyl compound unit contained in polymer block (C) are in the state of random copolymerization.

In view of micro-phase separating polymer block (C) from polymer block (A) and polymer block (B) and at the same time making it function as a cramping phase, as particularly preferred examples of polymer block (C), there can be mentioned a polystyrene-type block such as a poly-4-methylstyrene block, a poly-4-(t-butyl)styrene block or a poly-4,α-dimethylstyrene block; a copolymer block composed of a polystyrene-type block as mentioned above and polystyrene; a crystalline hydrogenated 1,4-polybutadiene block; a crystalline polyethylene block; a crystalline polypropylene block, etc.

Polymer block (C) can be crosslinked according to a known method in such an extent not to spoil the effects of the invention. By introducing crosslinkage, cramping strength is further heightened, and the shape stability of copolymer (Z) and thus electrochemical device tends to be increased.

The molecular weight of polymer block (C) can appropriately be chosen depending on the shape, required performance, etc. of the resulting electrochemical device. When the molecular weight is large, the mechanical characteristics of copolymer (Z) tends to be increased, but when the molecular weight is too large, molding of copolymer (Z) becomes difficult. When the molecular weight of polymer block (C) is small, its mechanical characteristics tend to be lowered. Thus, it is important to choose the molecular weight appropriately in accordance with necessary performance. Usually, the molecular weight is preferably chosen between 100 and 1,000,000, and more preferably chosen between 1,000 and 100,000, as number average molecular weight in terms of polystyrene.

Also when polymer block (C) is contained, the bond form of the blocks in copolymer (Z) can be a block copolymer or a graft copolymer or a combination thereof. As examples of the chain structure in the case of a block copolymer, there can be mentioned an A-B-C triblock copolymer, an A-B-C-A tetrablock copolymer, an A-B-A-C tetrablock copolymer, a B-A-B-C tetrablock copolymer, an A-B-C-B tetrablock copolymer, a C-A-B-A-C pentablock copolymer, a C-B-A-B-C pentablock copolymer, etc.

In the case of a graft copolymer, there can be mentioned a structure that one of polymer blocks (A), (B) and (C) is a stem and the other two polymer blocks are branches; a structure that one of polymer blocks (A), (B) and (C) is a stem, another one is grafted to the stem to form a first branch and the remaining one is grafted to the first branch to form a second branch; etc.

In the case of a combination of a block copolymer and a graft copolymer, there can be mentioned a structure that two of polymer blocks (A), (B) and (C) form a block copolymer, and the remaining one is grafted to the block copolymer as a stem to form a branch; etc.

When copolymer (Z) used in the invention contains polymer block (C), the proportion of polymer block (C) in copolymer (Z) is preferably 40% by mass or less, more preferably 35% by mass or less and still more preferably 30% by mass or less.

The number average molecular weight of copolymer (Z) used in the invention, in a state that an ion-conducting group is not introduced, is not particularly limited, but, usually, is preferably 10,000 to 2,000,000, more preferably 15,000 to 1,000,000 and still more preferably 20,000 to 500,000 as number average molecular weight in terms of polystyrene.

Copolymer (Z) used in the invention needs to have ion-conducting groups on polymer block (A). When ion conductivity is referred to in the invention, the ion may be a cation or an anion, and the cation includes proton, an alkali metal cation, an ammonium cation, an organic cation such as an imidazolium cation, etc., and the anion includes a hydroxide anion, a halide anion, etc.

When the ion to be conducted is a cation, the ion-conducting group is not particularly limited so long as it is a group capable of exhibiting sufficient ion conductivity, but above all, a sulfonic acid group or a phosphonic acid group or their salts represented by —$SO_3M$ or —$PO_3HM$ wherein M represents a hydrogen atom, or a cation such as an alkali metal cation or an organic cation, can be used preferably. As the cation-conducting group, a carboxyl group or its salts represented by —$CO_2M$ wherein M represents a hydrogen atom, or a cation such as an alkali metal cation or an organic cation, can also be used. In the above, as the alkali metal cation, there can be mentioned sodium cation, potassium cation, etc., and as the organic cation, there an be mentioned ammonium cation, imidazolium cation, pyridinium cation, etc. Among them, in view of ion conductivity, the sulfonic acid group or the phosphonic acid group or their salts are preferred, and, in view of easiness of introduction of the ion-conducting group into polymer block (A), the sulfonic acid group or the salts thereof are further preferred.

When the ion to be conducted is an anion, the ion-conducting group is not particularly limited so long as it is a group capable of exhibiting sufficient ion conductivity, but above all, a (substituted) ammonium group represented by —$N^+R^5R^6R^7X^-$ wherein $R^5$, $R^6$ and $R^7$ represent, respectively independently, hydrogen atoms or alkyl groups having 1 to 8 carbon atoms optionally having a substituent, and $X^-$ represents an anion such as a hydroxide anion or a halide anion, can be used preferably. As preferred examples of —$N^+R^5R^6R^7$, there an be mentioned —$N^+H_3$, —$N^+(CH_3)_3$, —$N^+(C_2H_5)_3$, etc.

As to the position of introduction of the ion-conducting group into polymer block (A), there is no particular limitation, but in view of easiness of the introduction, it is preferred to introduce the ion-conducting group onto the aromatic ring of the aromatic vinyl compound unit which is the main constituting unit.

The amount of the ion-conducting group introduced is appropriately chosen depending on the required performance of the electrochemical device, etc., but, in order to display sufficient ion conductivity to use it as an electrochemical device, and thus as an actuator device, the introduction amount is preferably such an amount that the ion exchange capacity of the copolymer (Z) becomes 0.30 meq/g or more, and is more preferably such an amount that the ion exchange capacity thereof becomes 0.40 meq/g or more. On the other hand, in view of mechanical strength of copolymer (Z), the introduction amount is preferably such an amount that the ion exchange capacity of the copolymer (Z) becomes 5 meq/g or less, and is more preferably such an amount that the ion exchange capacity thereof becomes 3 meq/g or less.

Processes for producing a copolymer (Z) used in the invention are not particularly limited, and are mainly classified into two processes. Namely, they are (1) a process which comprises producing a copolymer not having an ion-conducting group and then introducing an ion-conducting group into polymer block (A), and (2) a process which comprises producing a copolymer using a monomer having an ion-conducting group.

The first process is described below.

Depending on the kind, molecular weight, etc. of monomer(s) constituting polymer block (A) or (B), the process for producing polymer block (A) or (B) is appropriately chosen from a radical polymerization method, an anion polymerization method, a cation polymerization method, a coordination polymerization method and so on, and particularly in view of molecular weight, molecular weight distribution, the structure of copolymer (Z) and easiness of bond between polymer blocks (A) and (B), it is preferred to use a living polymerization method, and, specifically, it is preferred to use a living radical polymerization method, a living anion polymerization method or a living cation polymerization method.

As a specific example of the production process, a process for producing a copolymer (Z) having its components polymer block (A) composed of poly(α-methylstyrene) and polymer block (B) composed of poly (conjugated alkadiene) is described below. In the case, in view of industrial easiness and easiness of design of molecular structure, it is preferred to adopt a living anion polymerization method, and specific synthetic examples as follows can be mentioned.

(1) a process of obtaining an A-B-A block copolymer by polymerizing a conjugated alkadiene compound in tetrahydrofuran as a solvent using a dianion initiator, and then polymerizing α-methylstyrene under a temperature condition of −78° C. (Macromolecules, (1969), 2(5), 453-458), (2) a process of obtaining an $(A-B)_nX$ star-shaped block copolymer by bulk polymerizing α-methylstyrene using an anion polymerization initiator, polymerizing a conjugated alkadiene compound, and then conducting coupling reaction with a coupling agent such as tetrachlorosilane (Kautsch. Gummi, Kunstst., (1984), 37(5), 377-379; Polym. Bull., (1984), 12, 71-77), and (3) a process of obtaining an A-B-A block copolymer by polymerizing α-methylstyrene of a concentration of 5 to 50% by mass in a nonpolar solvent in the presence of a polar compound of a concentration of 0.1 to 10% by mass at a temperature of −30 to 30° C. using an organic lithium compound as an initiator, polymerizing a conjugated alkadiene compound with the resulting living polymer, and then adding a coupling agent.

Among the above-mentioned specific methods, the method of (3) can be adopted as a particularly preferred method in view of industrial economical efficiency.

In the above anion polymerization, cation polymerization or the like, by changing or adding a component to react, it is possible to add polymer block (C) as a component of the block copolymer.

When the unit (=repeating unit) constituting polymer block (B) has a carbon-carbon double bond as in a conjugated alkadiene unit, a conjugated cycloalkadiene unit or a vinylcycloalkene unit, in view of enhancement of deterioration resistance, etc. of the electrochemical device of the invention, it is preferred that part or all of the double bonds are hydrogenated. As a method for the hydrogenation, there can, for example, be mentioned a process of dissolving the polymer as a precursor in an organic solvent and reacting hydrogen in the presence of a hydrogenation catalyst. As the solvent used, there can be mentioned a hydrocarbon solvent such as cyclohexane, toluene or benzene; an ether solvent such as tetrahydrofuran or 1,4-dioxane; or the like. These organic solvents can be used alone or in a combination of two or more, but, in view of smooth progress of the hydrogenation reaction, the solvent used is preferably cyclohexane.

As the hydrogenation catalyst, there can be mentioned a Ziegler catalyst such as a nickel-type Ziegler catalyst or a cobalt-type Ziegler catalyst; a metallocene catalyst such as a titanocene catalyst; etc. These hydrogenation catalysts can be used alone or in a combination of two or more, but, in view of industrial economical efficiency and easiness of handling, the hydrogenation catalyst used is preferably a nickel-type Ziegler catalyst.

Processes for preparation of a nickel-type Ziegler catalyst are not particularly limited, and, for example, it can be prepared by reacting a nickel salt of an organic acid with a trialkyl aluminum.

The temperature of the hydrogenation can be 0 to 100° C., and the hydrogen pressure thereof can be 10 to 10,000 kPa, and it is preferred to conduct the hydrogenation under the condition of 20 to 90° C. and a hydrogen pressure of 500 to 3,000 kPa, in view of smooth progress of the reaction and industrial economical efficiency.

A process for bonding an ion-conducting group to the resulting copolymer is described below.

First, a process for introducing a sulfonic acid group into the copolymer is described. Sulfonation can be conducted by a known method. As such a method, there can be exemplified a process of preparing a solution or suspension of the copolymer in an organic solvent, and then adding a sulfonating agent and conducting mixing; a process of directly adding a gaseous sulfonating agent to the copolymer; and the like.

As the sulfonating agent to be used, there can be exemplified sulfuric acid, a mixture system of sulfuric acid and an aliphatic acid anhydride, chlorosulfonic acid, a mixture system of chlorosulfonic acid and trimethylsilyl chloride, sulfur trioxide, a mixture system of sulfur trioxide and triethyl phosphate, and, further, an aromatic organic sulfonic acid represented by 2,4,6-trimethylbenzenesulfonic acid, and so on. These can be used alone or in a combination of plural.

As the organic solvent to be used, there can be exemplified an aliphatic hydrocarbon such as hexane or cyclohexane; a halogenated hydrocarbon such as methylene chloride or ethylene dichloride. These can be used alone or in a combination of plural.

Next, a process for introducing a phosphonic acid group into the copolymer is described. Phosphonation can be conducted by a known method. There can, for example, be mentioned a process of preparing a solution or suspension of the copolymer in an organic solvent, reacting the copolymer with chloromethyl ether or the like in the presence of anhydrous aluminum chloride to introduce halomethyl groups onto the aromatic rings, reacting the resulting copolymer with phosphorus trichloride and anhydrous aluminum chloride added, and then conducting hydrolysis reaction to introduce phosphonic acid groups; and so on. There can further be exemplified a process of adding phosphorus trichloride and anhydrous aluminum chloride to the copolymer and reacting them to introduce phophinic acid groups into the aromatic rings, and then oxidizing the phophinic acid groups into phophonic acid groups with nitric acid; and so on.

As a process for introducing a (substituted) ammonium group into the resulting copolymer, a known method can be adopted, and there can, for example, be mentioned a process of introducing halomethyl groups onto the aromatic rings of the copolymer in the same way as in the above, and contacting ammonia or an organic amine with the resulting halomethylated copolymer to introduce ammonium groups whose counter anions are halide anions. It is possible to treat the resulting copolymer into which ammonium groups (counter anions:halide anions) were introduced with an alkali such as sodium hydroxide to convert the counter anions to hydroxide ions.

The process for producing a copolymer (Z) other than the process of introducing an ion-conducting group into the copolymer not having any ion-conducting groups as a precursor is a process of producing a copolymer (Z) using at least one monomer having an ion-conducting group.

As the monomer having an ion-conducting group, there can, for example, be exemplified styrenesulfonic acid, an α-alkyl-styrenesulfonic acid, vinylnaphthalenesulfonic acid, vinylanthracenesulfonic acid, styrenephosphonic acid, an α-alkyl-styrenephosphonic acid, vinylnaphthalenephosphonic acid, vinylanthracenephosphonic acid, vinylbenzoic acid, isopropenylbenzoic acid, isobutenylbenzoic acid, etc. These can be used alone or in a combination of two or more. Among them, in view of availability and easiness of polymerization, styrenesulfonic acid and α-alkyl-styrenesulfonic acid, vinylbenzoic acid and isopropenylbenzoic acid are preferred, and in view of the ion conductivity of the resulting copolymer (Z) or the performance of the resulting electrochemical device in addition to the above viewpoints, styrenesulfonic acid and α-methyl-styrenesulfonic acid are further preferred.

As the monomer having an ion-conducting group, a monomer wherein an ion-conducting group is bonded to a conjugated alkadiene compound can also be used, and there can, for example, be mentioned 1,3-butadiene-1-sulfonic acid, 1,3-butadiene-2-sulfonic acid, isoprene-1-sulfonic acid, isoprene-3-sulfonic acid, isoprene-4-sulfonic acid, 1,3-butadiene-1-phosphonic acid, 1,3-butadiene-2-phosphonic acid, isoprene-1-phosphonic acid, isoprene-3-phosphonic acid, isoprene-4-phosphonic acid, 1,3-butadiene-1-carboxylic acid, 1,3-butadiene-2-carboxylic acid, isoprene-1-carboxylic acid, isoprene-3-carboxylic acid, isoprene-4-carboxylic acid, etc.

As the monomer having an ion-conducting group, there can also be used vinylsulfonic acid, an α-alkyl-vinylsulfonic acid, a vinylalkylsulfonic acid, an α-alkyl-vinylalkylsulfonic acid, vinylphosphonic acid, an α-alkyl-vinylphosphonic acid, a vinylalkylphosphonic acid, an α-alkyl-vinylalkylphosphonic acid, vinylcaboxylic acid, an α-alkyl-vinylcaboxylic acid, a vinylalkylcarboxylic acid, an α-alkyl-vinylalkylcarboxylic acid, etc. Among them, vinylsulfonic acid and vinylphosphonic acid are preferred.

As the monomer having an ion-conducting group, there can further be used a (meth)acrylic monomer to which an ion-conducting group is bonded, and there can, for example, be mentioned methacrylic acid, acrylic acid, 2-acrylamido-2-methyl-1-propanesulfonic acid, etc.

In view of improving the polymerization properties of the monomer having an ion-conducting group, the ion-conducting group can be the form of a salt wherein the acidic group is neutralized with a proper metal cation (e.g., an alkali metal cation), an (organic)ammonium cation (e.g., an ammonium cation) or the like, or can be the form of an ester. In the former case, after its polymerization, the resulting polymer can be used as such or in the form of the acid after ion exchange by a suitable method. In the latter case, the resulting polymer can be used in the form of the acid after hydrolysis under an acidic condition or a basic condition, or in the form of a salt after conversion by a method stated hereinafter.

Part or all of the ion-conducting groups contained in copolymer (Z) can be converted into the form of a salt. The conversion into the form of a salt can, for example, be conducted by immersing copolymer (Z) in an aqueous solution of an alkali metal cation, an aqueous ammonia solution, an aqueous organic amine solution, an aqueous solution of an imidazole derivative or the like. There is no particular limitation on the condition of the immersion, and, for example, there can be mentioned a process of immersing it into the aqueous solution of 0.01 to 100 mol/L under a temperature condition of 0 to 100° C. for one minute to one week. On this occasion, the aqueous solution can be replaced with a new one.

Besides the ones mentioned above, there can, for example, be used a monomer having an ammonium group or an amino group as a precursor thereof. As examples thereof, there can, for example, be mentioned a vinylaniline such as 4-vinylaniline, 3-vinylaniline, 2-vinylaniline, 4-isopenylaniline, 3-isopenylaniline or 2-isopenylaniline, and a vinyl anilinium salt wherein the nitrogen atom of the vinylaniline is quaternary; an amino group-containing styrene derivative which has a spacer between the aromatic ring and the amino group such as 4-vinylbenzylamine or 4-isopropenylbenzylamine, and an ammonium salt wherein the nitrogen atom of the amino group-containing styrene derivative is quaternary; a vinylpyridine such as 4-vinylpyridine, 3-vinylpyridine, 2-vinylpyridine, 4-isopropenylpyridine, 3-isopropenylpyridine or 2-isopropenylpyridine, and a vinylpyridinium salt wherein the nitrogen atom of the vinylpyridine is made quaternary; an amino group-containing (meth)acrylic ester such as aminoethyl(meth)acrylate or aminopropyl(meth)acrylate, and an ammonium salt wherein the nitrogen atom of the amino group-containing (meth)acrylic ester is quaternary; an alkenylamine such as vinylamine, propenylamine or isopropenylamine, and an ammonium salt wherein the nitrogen atom of the alkenylamine is quaternary; etc. The amino group of such a monomer having an amino group can, besides a primary amino group, be a secondary amino group or tertiary amino group wherein the primary amino group is substituted with alkyl group(s).

When any of the above processes for introducing an ion-conducting group is used, the ion exchange capacity of the resulting copolymer (Z) or a molding using it, or the sulfonation proportion, phosphonation proportion or the like in polymer block (A) of copolymer (Z) can be determined using an analytic method such as a titration method, infrared spectroscopic analysis, nuclear magnetic resonance spectrum ($^1$H-NMR spectrum) measurement or the like.

In the invention, a molding containing as a main ingredient a copolymer (Z) obtained in a way as mentioned above is used. The molding can be composed only of copolymer (Z), but can further contain one or two or more selected from another resin, a softening agent, water, an organic solvent, another additive, an inorganic filler and the like so long as the effects of the invention are not spoiled.

As examples of another resin, there can, for example, be mentioned polyolefin resins such as propylene homopolymers, ethylene-propylene random copolymers, ethylene-propylene block copolymers, propylene-butene-1 copolymers, propylene-ethylene-butene-1 copolymers, propylene-4-methylpentene-1 copolymers, ethylene homopolymers (e.g., high density polyethylenes, low density polyethylenes and linear low density polyethylenes), ethylene-butene-1 copolymers, ethylene-hexene copolymers, ethylene-heptene copolymers, ethylene-octene copolymers, ethylene-4-methylpentene-1 copolymers, ethylene-vinyl acetate copolymers, ethylene-vinyl alcohol copolymers, ethylene-acrylic acid copolymers, ethylene-acrylic ester copolymers, ethylene-methacrylic acid copolymers and ethylene-methacrylic ester copolymers; polyether resins such as polyoxymethylenes and polyphenylene ether resins; polyamide resins such as polyamide 6, polyamide 6,6, polyamide 6,10, polyamide 11, polyamide 12, polyamide 6,12, polyhexamethylenediamine terephthalamide, polyhexamethylenediamine isophthalamide, polynonamethylenediamine terephthalamide and xylylene group-polyamides; polyester resins such as polyethylene terephthalates, polyebutylene terephthalates and polynaphthylene terephthalates; styrene resins such as polystyrene, poly-α-methylstyrene, poly-p-methylstyrene, acrylonitrile-styrene resins and acrylonitrile-butadiene-styrene resins; polycarbonate resins; rubbers such as natural rubber, synthetic isoprene rubber, butadiene rubber, styrene-butadiene rubber, styrene-isoprene rubber, chloroprene rubber, acrylic rubber, butyl rubber, acrylonitrile-butadiene rubber, epichlorohydrine rubber, silicone rubber, fluororubber, urethane rubber; thermoplastic elastomers such as polyurethane elastomers, polyamide elastomers, polyester elastomers, styrene elastomers (TPS) and olefin elastomers (TPO); etc. These can be used alone or in a combination of two or more.

As the softening agent, there can, for example, be mentioned petroleum-type softening agents such as paraffin-, naphthene- or aroma-process oils; paraffins; vegetable oil-type softening agents; plasticizers; etc., and they can be used alone or in a combination of two or more.

As the organic solvent, there can, for example, be mentioned aliphatic hydrocarbons such as hexane and cyclohexane; aromatic hydrocarbons such as benzene, toluene and xylene; ketone compounds such as acetone, methyl ethyl ketone, methyl isobutyl ketone and cyclohexanone; ester compounds such as ethyl acetate, butyl acetate, ethyl butyrate and ethyl lactate; alcohol compounds such as methanol, ethanol, propanol, isopropanol, butanol, isobutyl alcohol and octanol; carbonate compounds such as ethylene carbonate and propylene carbonate; glycol compounds such as ethylene glycol and propylene glycol; nitrile compounds such as acetonitrile and propionitrile; ether compounds such as diethyl ether, tetrahydrofuran and 1,4-dioxane; amide compounds such as dimethylacetamide, dimethylformamide and N-methylpyrrolidone; sulfoxide compounds such as dimethyl sulfoxide; etc. These can be used alone or in a combination of two or more. Among them, carbonate compounds, nitrile compounds and glycol compounds are preferred, and in view of affinity to copolymer (Z), particularly polymer block (A), ethylene carbonate and propylene carbonate are further preferred.

As another additive, there can, for example, be mentioned phenol-type stabilizers, sulfur-type stabilizers, phosphorus-type stabilizers, light stabilizers, antistatic agents, mold release agents, flame retardants, foaming agents, pigments, dyes, brighteners, carbon fiber, etc., and these can be used alone or in a combination of two or more.

As the inorganic filler, there can, for example, be mentioned talc, calcium carbonate, silica, glass fiber, mica, kaolin, titanium oxide, carbon black, etc., and these can be used alone or in a combination of two or more.

The content of copolymer (Z) in the molding of the invention is preferably 50% by mass or more, more preferably 70% by mass or more, further more preferably 80% by mass or more and still further more preferably 90% by mass or more, in view of ion conductivity and the performance of the electrochemical device or actuator device.

As to a process for preparing a molding containing copolymer (Z), any process can be adopted so long as it is a usual process for such preparation, and there can, for example, be mentioned a process which comprises mixing a copolymer (Z), or a copolymer (Z) and additive(s) as mentioned above with a suitable solvent to dissolve or suspend the copolymer (Z), casting the resulting solution or suspension onto a sheet material such as glass, and then removing the solvent under an appropriate condition to obtain a membrane having a desired thickness; compression molding; roll molding; extrusion molding; injection molding; etc. An appropriate process can be selected from these processes according to a desired shape of the resulting electrochemical device. As the suitable solvent, there can be exemplified an organic solvent mentioned above as an optional ingredient in the molding used in the invention; and water.

The electrochemical device of the invention comprises a molding containing a copolymer (Z) and at least two mutually insulated electrodes in joint with the molding. In this connection, as an electrode active material constituting such an electrode, known ones can be used, and there can, for example, be mentioned noble metals such as gold, platinum, iridium, palladium and ruthenium; base metals such as silver, copper and nickel; carbon materials such as active carbon, carbon black and graphite; electrically conductive polymers such as polyaniline, polypyrrole, polythiophene and polyacetylene; etc. Among them, in view of corrosion resistance, noble metals, carbon materials and electrically conductive polymers are preferred, and, in an additional view of the performance of the electrochemical device, gold, active carbon, polyaniline and polypyrrole are further preferred.

Formation of an electrode can be made by a known method, and as such known methods, there can, for example, be mentioned a method of vacuum depositing a metal; a method of spattering a metal; a method of electroplating a metal; a method of chemical plating a metal; a method of applying an ink wherein a metal, a carbon material or an electrically conductive macromolecule is dissolved or dispersed in an appropriate binder; a method of press bonding or depositing an electrode made separately; etc. Among them, in view of the performance of the resulting electrochemical device, the chemical plating method and the method of applying such an ink are preferred, and the chemical plating method is further preferred.

The chemical plating method is specifically described below. In the chemical plating method, it is utilized that when the ion-conducting group of copolymer (Z) is a cation-conducting group, it acts as a cation exchange group, and an electrode can be formed by introducing a metallic cation (containing a complex ion) and, then, reducing the introduced metallic cation using an appropriate reducing agent to form the metal of 0 valence (e.g., Chem. Mater., (2000), 12, 1750-1754). As sources of metallic cations, there can be used complexes or salts of the above-mentioned noble metals or base metals.

As examples of such metallic complexes, there can be mentioned phenanthroline complexes, bisethylenediamine complexes, ammonia complexes, bipyridyl complexes, etc. of various metals.

As examples of such metallic salts, there can be mentioned chlorides, bromides, nitrates, sulfates, phosphates, carboxylates, etc. of various metals.

These can be used alone or in a combination of two or more. As sources of the metallic cations, among them, metallic complexes are preferred in view of easiness of preparation and handling, and complexes of gold or platinum are further preferred in an additional view of the performance of the resulting electrochemical device.

Processes for introducing such a metallic cation are not particularly limited, and, for example, the introduction can easily be conducted by immersing copolymer (Z) in an aqueous solution of such a metallic complex or metallic salt.

As a reducing agent for reducing the introduced metallic cation, an appropriate one can be selected from known ones and used, and, as such known ones, there can, for example, be mentioned sodium borohydride, lithium borohydride, sodium ascorbate, ascorbic acid, sodium sulfite, a dimethylamine-borane complex, etc. These can be used alone or in a combination of two or more.

There is no particular limitation as to methods for reducing the metallic cation, and known methods can be used, and there can, for example, be mentioned a process of immersing copolymer (Z) into which the metallic cations are introduced in an aqueous solution of such a reducing agent, and conducting reduction reaction under a suitable temperature condition of, e.g., 20 to 100° C.

The shape of the electrochemical device of the invention is not particularly limited, and there can, for example, be mentioned membranes, films, sheets, boards, fiber, rods, cubes, rectangular parallelepipeds, globes, Rugby ball shapes, complicated shapes, etc., and an appropriate shape can be selected therefrom according to the purposes of use. The thickness of the electrochemical device is not particularly limited, either, and, when the shape of the electrochemical device is a membrane, the electrodes are preferably formed on both sides of the membrane, and the thickness of the electrochemical device is preferably in the range of $10^{-6}$ to $10^{-1}$ m.

The copolymer (Z)-electrodes composite, namely electrochemical device of the invention obtained in a way mentioned above is intrinsically a piezoelectric element, and, thus, can be utilized as various devices including an actuator device, and, as other examples of the various devices, there can, for example, be mentioned sensor devices detecting pressure, force, displacement, etc.; capacitor devices; etc. When the electrochemical device of the invention is utilized as an actuator device, by applying an electric field to the electrodes mutually insulated, the device is actuated. When the electrochemical device of the invention is utilized as a sensor, by connecting the mutually insulated electrodes and a voltmeter, voltage generated when the device is deformed is detected and sensed. Since an electrical double layer is formed in the neighborhood of the electrodes by application of voltage, the electrochemical device of the invention can also be made to function as a capacitor.

The electrochemical device of the invention can be used in various environments, and can, for example, be used in water, in an aqueous solution of a salt, in an organic solvent or in a wet environment such as in a human body. Since the electrochemical device of the invention displays a particularly high function in a wet state, it can also be possible to seal the electrochemical device in a wet state and use the resulting device in air or in a vacuum. There is no particular limitation on materials used for the sealing, and there can be used various resins, metals or the like. As the organic solvent in the above, there can be exemplified an organic solvent mentioned above as an optional ingredient of the molding used in the invention.

EXAMPLES

The present invention is further specifically described below through examples, comparative examples and referential examples, but the invention is not limited by them. Measuring instruments, measuring methods and materials used in the following referential examples, examples and comparative examples are described below.

(1) Analysis of the Molecular Structure of Block Copolymers and Copolymers (Z) by Nuclear Magnetic Resonance Spectrum ($^1$H-NMR Spectrum)

Instrument: Nuclear magnetic resonance instrument made by JEOL. Ltd. (JNM-LA 400)

Solvent: Chloroform-d alone or a mixture of tetrahydrofuran-$d_8$ and methanol-$d_4$ (mass ratio 80:20)

(2) Measurement of Number Average Molecular Weight (Mn) and Molecular Weight Distribution (Mw/Mn) by Gel Permeation Chromatography (GPC) (Mw is Weight Average Molecular Weight)
- Instrument: Gel permeation chromatograph made by TOSOH CORPORATION (HLC-8020)
- Column: GMHXL, G4000HXL and G5000HXL either of which is TSKgel made by TOSOH CORPORATION, were connected in series.
- Eluent: Tetrahydrofuran, flow rate 1.0 ml/minute
- Calibration curve: Made using standard polystyrene
- Detection method: Differential refractive index (RI)

(3) Measurement of Ion Exchange Capacity of Copolymer (Z) or a Copolymer (Z)-Electrodes Composite A copolymer (Z) was weighed (a(g)) in a glass vessel which can be shut tightly. As to a copolymer (Z)-electrodes composite, it was weighed (a(g)), immersed overnight in a largely excess amount of an aqueous solution of lithium chloride (1 mol/L) and then put with the wet state into a glass vessel which can be shut tightly. An excess amount of an aqueous saturated sodium chloride solution was added into the glass vessel, and the mixture was stirred overnight. Hydrogen chloride formed in the system was titrated (b(ml)) with a 0.01 N aqueous NaOH standard solution (titer f) using a phenolphthalein solution as an indicator. The ion exchange capacity of the copolymer (Z) or the copolymer (Z)-electrodes composite was calculated according to the following equation.

Ion exchange capacity=$(0.01 \times b \times f)/a$ (4) Tension Test

A copolymer (Z)-electrodes composite was cut out into a dumbbell shape and then kept in a 1 mol/L aqueous solution of lithium chloride for 24 hours or more, and, then, its tensile strength (tension at break) and tensile elongation (elongation at break) were measured under a condition of a pulling rate of 200 mm/min using a universal testing machine ("TM-MS-134" made by Instron Japan Co., Ltd.).

(5) Actuation Test 4 sides of a copolymer (Z)-electrodes composite were cut off into a size of a breadth of about 5 mm and a length of about 40 mm, and, also thereby, the electrodes on both sides of the membrane were insulated with each other. The resulting copolymer (Z)-electrodes composite was kept overnight in a 1 mol/L aqueous solution of lithium chloride, water on the surface of the composite was wiped off, and, then, a copper foil-sealed tape cut into a size of a breadth of 1 mm ("CU7636R" made by SONY Chemical Co.) was stuck on each of the two electrodes mutually insulated to obtain an device. The resulting device was connected to a direct current stabilization power source apparatus ("PMC18-3" made by Kikusui Electronic Industry Co.), direct current voltage was applied to the device (i) in such a state that the device was immersed in distilled water (1.2 V) and (ii) in the air immediately after the device was pulled up from the distilled water (5 V), and, then, the presence of activation, the amount of deformation (curvature angle) and activation speed were determined through visual observation. More specifically, the amount of deformation was measured from the photographs of the device before and after the deformation using a protractor, and the activation speed was measured using a stopwatch.

Referential Example 1

Production of a Block Copolymer Composed of Poly (α-Methylstyrene) (Polymer Block (A)) and Hydrogenated Polybutadiene (Polymer Block (B))

In a similar process to a previously reported process (WO 02/40611), a poly(α-methylstyrene)-b-polybutadiene-b-poly (α-methylstyrene) triblock copolymer was synthesized. As to the resulting triblock copolymer, Mn and Mw/Mn of the poly(α-methylstyrene) part were 6,600 and 1.08, respectively, Mn and Mw/Mn of the whole copolymer were 80,590 and 1.07, respectively, and the amount of 1,4-bond and the content of α-methylstyrene unit in the polybutadiene part were 58.9% and 28.7% by mass, respectively. Further, it was revealed by composition analysis through $^1$H-NMR spectrum measurement that α-methylstyrene was substantially not copolymerized into the polybutadiene block.

The triblock copolymer obtained was dissolved in cyclohexane, the solution was put in a pressure proof vessel, the atmosphere of the vessel was replaced with nitrogen, hydrogen gas was introduced into the vessel, and hydrogenation reaction was conducted, in the presence of a nickel-type Ziegler catalyst, under the condition of a hydrogen pressure of 981 kPa and a temperature of 80° C. to obtain a poly(α-methylstyrene)-b-hydrogenated polybutadiene-b-poly(α-methylstyrene) triblock copolymer (hereinafter abbreviated as mSEBmS). The hydrogenation proportion of the obtained HmSEBmS by $^1$H-NMR spectrum measurement was 99.7%.

Referential Example 2

Sulfonation of mSEBmS 355 g of mSEBmS obtained in Referential example 1 was vacuum dried for 1 hour in a glass-made reaction vessel equipped with a stirrer, the inside atmosphere of the reaction vessel was replaced with nitrogen, 3 L of methylene chloride was added, and the mixture was stirred at 35° C. for 2 hours to dissolve mSEBmS. After the dissolution, a sulfonating reagent prepared by reacting 34.7 ml of acetic anhydride with 77.5 ml of sulfuric acid at 0° C. in 155 ml of methylene chloride was gradually added dropwise thereto over a period of 5 minutes. After stirring at 35° C. for 7 hour, the reaction solution was poured into 10 L of distilled water under stirring to coagulate and deposit a sulfonated mSEBmS. The deposited solid matter was washed with distilled water of 90° C. for 30 minutes, and then filtered. This operation of washing and filtration was repeated until the pH of the washings became unchanged, and the polymer after the final filtration was vacuum dried to obtain the sulfonated mSEBmS. The sulfonation proportion of the benzene rings of the α-methylstyrene units in the sulfonated mSEBmS was 49.8% by mol from $^1$H-NMR spectrum measurement, and its ion exchange capacity was 1.08 meq/g.

Referential Example 3

Sulfonation of polystyrene-b-poly(ethylene/butylene)-b-polystyrene

Similar operations as in Referential example 2 were conducted except that polystyrene-b-poly(ethylene/butylene)-b-polystyrene ("SEPTON 8007" made by KURARAY Co., Ltd., hereinafter abbreviated as SEBS) was used in place of mSEBmS, whereby a sulfonated SEBS was obtained. The sulfonation proportion of the benzene rings of the styrene units in the sulfonated SEBS was 48.5% by mol, and its ion exchange capacity was 1.21 meq/g.

The sulfonation proportions and ion exchange capacities of the sulfonated mSEBmS of Referential example 2, the sulfonated SEBS of Referential example 3 and the fluorine-type ion exchange resin membrane used in Referential example 8 hereinafter described are shown together in the following Table 1.

TABLE 1

|  | Sulfonation proportion[2] (mol %) | Ion exchange capacity (meq/g) |
|---|---|---|
| Sulfonated mSEBmS | 49.8 | 1.08 |
| Sulfonated SEBS | 48.5 | 1.21 |
| Nafion 117[1] | — | 0.91 |

[1] Made by DuPont Co., tetrafluoroethylene-perfluoro(sulfonylethyl vinyl ether) copolymer
[2] The proportion of introduction of sulfonic acid groups into the benzene rings of the aromatic vinyl compound units Referential Example 4

Production of a Sulfonated mSEBmS Molding and a Sulfonated SEBS Molding 0.515 g of the sulfonated mSEBmS synthesized in Referential example 2 was dissolved in 10.3 g of a mixed solvent of toluene and isobutyl alcohol (mass ratio 80:20) to prepare a 5% by mass solution, the solution was poured into a frame of 5 cm×5 cm made of polytetrafluoroethylene to obtain a membrane molding (preparation of the membrane by casting). The obtained molding was vacuum dried at 40° C. for 24 hours and then used for a test described later. The average thickness of the membrane was 190 μm.

In a similar way, a membrane molding was obtained using the sulfonated SEBS obtained in Referential example 3. The average thickness of the membrane was 201 μm.

Referential Example 5

Preparation of a Gold-Phenanthroline Complex 0.5 g of 1,10-phenanthroline (made by Wako Pure Chemical Industries, Ltd.) and 80 ml of distilled water were put in a 300-ml glass-made reaction vessel equipped with a reflux condenser, and the mixture was heated at 60° C. to dissolve the phenanthroline and cooled to room temperature. While the solution was stirred, a solution obtained by dissolving 1 g of tetrachloroauric acid (III) tetrahydrate in 17.2 ml of distilled water was gradually added dropwise over a period of 30 minutes. After completion of the dropwise addition, the temperature was raised to 110° C., the mixture was refluxed for 5 hours, and, then, 150 g of ammonium chloride was added to the resulting reaction solution to deposit orange powder. The deposited powder was filtered, washed with cold methanol and then with cold diethyl ether, and then dried to obtain 0.79 g of a gold-phenanthroline complex (hereinafter abbreviated as $[Au(phen)Cl_2]^+Cl^-$).

Example 1

Production of a Sulfonated mSEBmS-Gold Electrodes Composite

An Electrochemical Device of the Invention 48 mg of $[Au(phen)Cl_2]^+Cl-$ obtained in Referential example 5 was dissolved in 96 ml of distilled water to obtain an aqueous gold complex solution of yellow. The membrane molding of the sulfonated mSEBmS obtained in Referential example 4 was immersed in the solution, and the mixture was stirred overnight by shaking. After being allowed to stand, the resulting aqueous solution was decolored, whereas the membrane molding was colored yellow to show that the gold complex was taken into the membrane molding. The resulting membrane molding was washed with distilled water and immersed in a reducing solution obtained by dissolving 1.26 g of sodium sulfite in distilled water, and the mixture was warmed to 60° C. and subjected to reduction reaction for 4 hours. During the reduction reaction, the reducing solution was changed for a new one every one hour.

The above steps from the introduction of the gold complex to the reduction were repeated twice to obtain a sulfonated mSEBmS-gold electrodes composite.

Example 2

Production of a Sulfonated SEBS-Gold Electrodes Composite

An Electrochemical Device of the Invention

Similar operations as in Example 1 were conducted except that the membrane molding of the sulfonated SEBS obtained in Referential example 4 was used in place of the membrane molding of the sulfonated mSEBmS, whereby a sulfonated SEBS-gold electrodes composite was obtained.

Comparative Example 1

Production of a Fluorine-Type Ion Exchange Resin Membrane-Gold Electrodes Composite An Electrochemical Device as a Comparative Example Similar operations as in Example 1 were conducted except that a fluorine-type ion exchange resin membrane [a tetrafluoroethylene-perfluoro(sulfoethyl vinyl ether) copolymer, "Nafion 117" made by DuPont Co., the average thickness of the membrane 200 μm] was used in place of the membrane molding of the sulfonated mSEBmS, and the steps from the introduction of the gold complex to the reduction were repeated three times, whereby a fluorine-type ion exchange resin membrane-gold electrodes composite was obtained.

Test Example 1

Tests on the Sulfonated mSEBmS-Gold Electrodes Composite and an Actuator Device Made Using the Composite Measurement of ion exchange capacity and tension test were conducted on the sulfonated mSEBmS-gold electrodes composite produced in Example 1, and the afore-mentioned actuation test was conducted on an actuator device made using the composite according to the afore-mentioned actuation test. The results of the measurement of ion exchange capacity, the tension test and the actuation test are shown in Table 2, and the affairs at the actuation test are shown in FIG. 1.

Test Example 2

Tests on the Sulfonated SEBS-Gold Electrodes Composite and an Actuator Device Made Using the Composite Measurement of ion exchange capacity and tension test were conducted on the sulfonated SEBS-gold electrodes composite produced in Example 2, and the afore-mentioned actuation test was conducted on an actuator device made according to the afore-mentioned actuation test, using the composite. The results of the measurement of ion exchange capacity, the tension test and the actuation test are shown in Table 2.

Test Example 3

Tests on a Fluorine-Type Ion Exchange Resin Membrane-Gold Electrodes Composite and an Actuator Device Made Using the Composite Measurement of ion exchange capacity and tension test were conducted on the fluorine-type ion exchange resin membrane-gold electrodes composite produced in Comparative example 1, and the afore-mentioned actuation test was conducted on an actuator device made according to the afore-mentioned actuation test, using the composite. The results of the measurement of ion exchange capacity, the tension test and the actuation test are shown in Table 2.

TABLE 2

|  | Unit | Example 1 | Example 2 | Comparative example 1 |
|---|---|---|---|---|
| Polymer-gold electrodes composite |  | Sulfonated mSEBmS-gold electrodes composite | Sulfonated SEBS-gold electrodes composite | Nafion 117-gold electrodes composite |
| Ion exchange capacity[1] | meq/g | 0 | 0 | 0 |
| Tension test |  |  |  |  |
| Tensile strength | MPa | 16.9 | 19.2 | 22.2 |
| Tensile elongation | % | 570 | 540 | 75 |
| Actuation test |  |  |  |  |
| In water (speed) | second | 5.2 | 6.1 | 9.8 |
| In water (deformation amount) | ○ | 13 | 12 | 8 |
| In the air (speed) | second | 1.4 | 2.1 | 5.3 |
| In the air (deformation amount) | ○ | 46 | 52 | 49 |

[1] The polymer-gold electrodes composite after overnight immersion in 1 mol/L aqueous lithium chloride solution was used.

It is understood from Table 2 that any of the ion exchange capacities of the copolymer (Z)-gold electrodes composites of Examples 1 and 2 and the Nafion 117-gold electrodes composites of Comparative example 1 is 0, and, thus, the sulfonic acid groups existing in each of the polymers are in the form of lithium salts.

As apparent from Table 2, although the tensile strengths of the polymer-gold electrodes composites are almost equal in Example 1, Example 2 and Comparative example 1, as to tensile elongation, larger elongation was observed in Examples 1 and 2 than in Comparative example 1, which suggests that the copolymer (Z)-gold electrodes composites of Examples 1 and 2 are flexible and can follow a large deformation without collapse of the actuator devices.

It is also apparent from Table 2 that, in the results of the actuation test on the actuator devices, the scale of the actuation is almost equal in Example 1, Example 2 and Comparative example 1, but, as to the actuation speed, Examples 1 and 2 are superior to Comparative example 1.

INDUSTRIAL APPLICABILITY

The electrochemical device or thus actuator device of this invention can be actuated swiftly; is excellent in industrial economical efficiency; has only a low influence on the environment because of substantially not containing any halogen device; holds self-standing properties without introduction of nonuniform chemical crosslinkage structure; and is excellent in mechanical strength. Therefore, the electrochemical device or thus actuator device of this invention can suitably be used in fields such as medical instruments, micromachines, industrial robots and personal robots.

The invention claimed is:

1. An electrochemical device which comprises a molding containing as a main ingredient a copolymer (Z) and at least two mutually insulated electrodes in joint with the molding, wherein the copolymer (Z) (1) contains only an α-methylstyrene unit as an aromatic vinyl compound unit, (2) comprises a polymer block (A) having as a main unit an α-methylstyrene unit and a polymer block (B) which is incompatible with the polymer block (A) and has as a main unit at least one unit selected from the group consisting of an alkene unit having 2 to 8 carbon atoms, a cycloalkene unit having 5 to 8 carbon atoms, a vinylcycloalkene unit having 7 to 10 carbon atoms, a conjugated alkadiene unit having 4 to 8 carbon atoms and a conjugated cycloalkadiene unit having 5 to 8 carbon atoms; and a vinylcycloalkene unit having 7 to 10 carbon atoms, a conjugated alkadiene unit having 4 to 8 carbon atoms and a conjugated cycloalkadiene unit having 5 to 8 carbon atoms in which units, part or all of carbon-carbon double bonds are hydrogenated, and (3) has an ion-conducting group on the polymer block (A).

2. The electrochemical device according to claim 1 as an actuator device.

3. The electrochemical device according to claim 1, wherein the α-methylstyrene unit is present in an amount of 90% by mol or more in the polymer block (A).

4. The electrochemical device according to claim 1, wherein the main unit composing the polymer block (B) is a conjugated alkadiene unit having 4 to 8 carbon atoms.

5. The electrochemical device according to claim 1, wherein the main unit composing the polymer block (B) is a conjugated cycloalkadiene unit having 4 to 8 carbon atoms in which part or all of carbon-carbon double bonds are hydrogenated.

6. The electrochemical device according to claim 5, wherein 90% by mol or more of the carbon-carbon double bonds are hydrogenated.

7. The electrochemical device according to claim 1, wherein the mass ratio of polymer block (A) to polymer block (B) is 90:10 to 10:90.

8. The electrochemical device according to claim 1, wherein the ion conducting group is a sulfonic acid group or a phosphonic acid group or a salt thereof represented by —$SO_3M$ or —$PO_3HM$ wherein M represents a hydrogen atom, an alkali metal cation or an ammonium cation.

* * * * *